(12) United States Patent
Erickson et al.

(10) Patent No.: US 7,746,883 B2
(45) Date of Patent: Jun. 29, 2010

(54) MULTI-DROP ETHERNET

(75) Inventors: Michael J. Erickson, Loveland, CO (US); Daniel V. Zilavy, Fort Collins, CO (US); Edward A. Cross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1520 days.

(21) Appl. No.: 11/069,073

(22) Filed: Mar. 1, 2005

(65) Prior Publication Data
US 2006/0198389 A1    Sep. 7, 2006

(51) Int. Cl.
H04J 3/16 (2006.01)
H04J 3/22 (2006.01)
H04L 12/66 (2006.01)
G06F 15/16 (2006.01)

(52) U.S. Cl. .............. 370/419; 370/463; 370/466; 370/469; 709/250

(58) Field of Classification Search ......... 370/419, 370/463, 466, 469; 709/250
See application file for complete search history.

(56) References Cited

U.S. PATENT DOCUMENTS

| | | | | |
|---|---|---|---|---|
| 5,818,842 | A * | 10/1998 | Burwell et al. | 370/397 |
| 5,862,171 | A * | 1/1999 | Mahany | 375/132 |
| 5,892,926 | A * | 4/1999 | Witkowski et al. | 710/100 |
| 6,195,688 | B1 * | 2/2001 | Caldwell et al. | 709/208 |
| 6,446,192 | B1 * | 9/2002 | Narasimhan et al. | 712/29 |
| 6,529,961 | B1 * | 3/2003 | Bray | 709/250 |
| 6,640,822 | B2 * | 11/2003 | Tinsley et al. | 137/10 |
| 6,785,827 | B2 * | 8/2004 | Layton et al. | 713/300 |
| 6,813,279 | B1 * | 11/2004 | Trainin | 370/466 |
| 7,020,729 | B2 * | 3/2006 | Taborek et al. | 710/305 |
| 7,031,341 | B2 * | 4/2006 | Yu | 370/469 |
| 7,197,052 | B1 * | 3/2007 | Crocker | 370/474 |
| 7,203,728 | B2 * | 4/2007 | Lum | 709/208 |
| 7,272,679 | B2 * | 9/2007 | Taborek et al. | 710/305 |
| 7,292,597 | B2 * | 11/2007 | Mills et al. | 370/433 |
| 7,327,688 | B2 * | 2/2008 | Burwell et al. | 370/242 |
| 7,343,425 | B1 * | 3/2008 | Lo et al. | 709/246 |
| 7,599,372 | B2 * | 10/2009 | Kwak et al. | 370/395.1 |
| 2002/0019891 | A1 * | 2/2002 | Morrow et al. | 710/8 |
| 2002/0112070 | A1 * | 8/2002 | Ellerbrock et al. | 709/238 |
| 2003/0154285 | A1 * | 8/2003 | Berglund et al. | 709/227 |
| 2005/0213693 | A1 * | 9/2005 | Page | 375/354 |
| 2005/0220103 | A1 * | 10/2005 | Wild et al. | 370/390 |

OTHER PUBLICATIONS

"Smart Network Controller", IBM Technical Disclosure Bulletin, Nov. 1989, US, vol. 32, Issue No. 6B, pp. 142-143.*

(Continued)

Primary Examiner—Alpus H Hsu

(57) ABSTRACT

Systems, methodologies, media, computing devices, network adapters, and other embodiments associated with network communications are described. One exemplary system embodiment includes a multi-drop Ethernet network.

12 Claims, 6 Drawing Sheets

OTHER PUBLICATIONS

Jonas Berge, Fieldbus, Ethernet and the reality of convergence, The Industrial Ethernet Book, issue Nov. 23, 2004, http://ethernet.industrial-networking.com/ieb/articles.asp.

Mario Bernardini, How to Enhance Older Automation Equipment . . . , B & B Electronics White Paper, 2003, pp. 1-2.

Using RS-485/RS-422 Transceivers in Fieldbus Networks, Dec. 27, 2002, pp. 1-5, http://www.maxim-ic.com/appnotes.cfm/appnote_number/1833, Dallas Semiconductor MAXIM.

RS485 Data Interface-a Tutorial, RS485 Data Acquisition Communications, http://www.arcelect.com/RS485_info_Tutorial.htm, Jan. 24, 2005, pp. 1-6, ARC Electronics.

Jan Stanek & Jan Rehak, Hardware Server, Introduction to RS422 & RS 485, copyright 1997, 1998 HW server, pp. 1-11.

Campbell Scientific Canada Corp, RS-485 Multidrop Interface, Apr. 2004, pp. 1-4.

\* cited by examiner

MULTI-DROP ETHERNET

BACKGROUND

Ethernet is a local area network that is described by IEEE 802.3. Ethernet is a very widely used protocol for networking devices together. Typically, cabling between devices is point-to-point where only two devices can share a physical bus. Point-to-point configurations require the use of more hardware such as switches and hubs and are less expandable than a multi-drop network configuration. A prior method of multi-drop Ethernet cabling was called 10base2 where "10" represents 10 megabytes per second, "base" represents "base band", and "2" represents a maximum single cable length of 200 meters. 10base2 was once an accepted form of networking where devices could be networked together using the same wires, creating a multi-drop network. Over time, 10baseT and 100baseT point-to-point wiring soon became favored for networks in general and 10base2 hardware became less common and more expensive. However, a multi-drop Ethernet is still useful in some cases, such as embedded networks.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
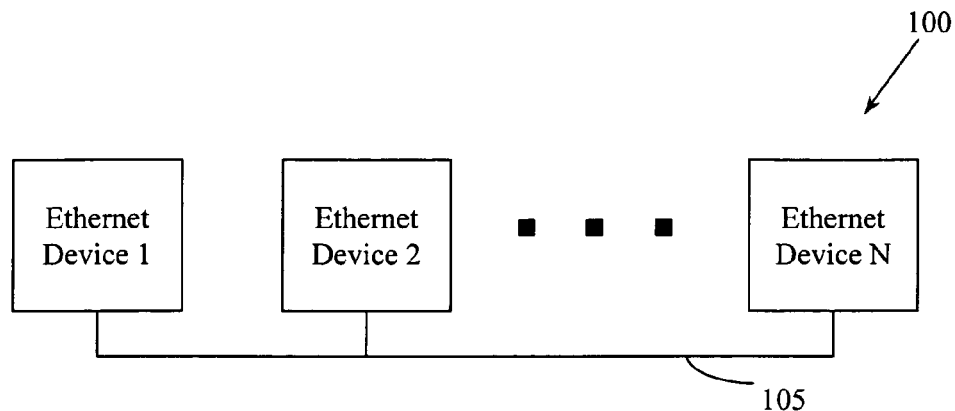
FIG. 1 illustrates one embodiment of Ethernet devices configured in a multi-drop network.

Example systems, methods, media, network adapters, and other embodiments are described herein that relate to multi-drop networking of devices. With reference to FIG. 1, one embodiment of a multi-drop network 100 is illustrated that includes a number of Ethernet devices (e.g., device 1, device 2, device N) that are configured as a multi-drop network on a communications bus 105. An Ethernet device can be any type of electrical device that is connectable to the network 100 such as a personal computer, a server, a digital camera, a facsimile machine, an imaging device, or other type of electronic device. In one embodiment, the Ethernet devices can include a group of servers that are mounted within a rack to form an embedded network.

As will be described in various embodiments, a network adapter can be provided that converts Ethernet-based communications to non-Ethernet-based communications (and vice-versa) so that a transceiver can be used that is configurable into a multi-drop arrangement. In one example implementation, the Ethernet devices can be configured as a multi-drop network using RS-485 transceivers where a network adapter is configured to convert Ethernet-based communications to RS-485-based communications and vice-versa.

Using RS-485 transceivers to create a multi-drop network, up to 256 devices can be implemented in a similar manner and placed on the same multi-drop bus. Devices on the bus can be dynamically hot-swapped on or off the bus. RS-485 transceivers are inexpensive and can provide a cost effective solution to create a multi-drop Ethernet network.

RS-485, also referred to as EIA-485, is a communications standard created by the Electronics Industry Association (EIA). RS-485 is an EIA serial line standard that specifies 2-wire, half-duplex, differential line, multi-point communications. Currently defined maximum data rates are 10 Mbps at 1.2 m or 100 Kbps at 1200 m. EIA-485 can implement a truly multi-point communications network, and specifies up to 32 drivers and 32 receivers on a single (2-wire) bus. Full-duplex can also be implemented.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software stored on a computer-readable-medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software stored in a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data signals, data packets or other network formatted signals, clock signals, one or more computer or processor instructions, messages, a bit or bit stream, combinations of the above, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

"User", as used herein, includes but is not limited to one or more persons, software, computers or other devices, or combinations of these.

Figure 2:
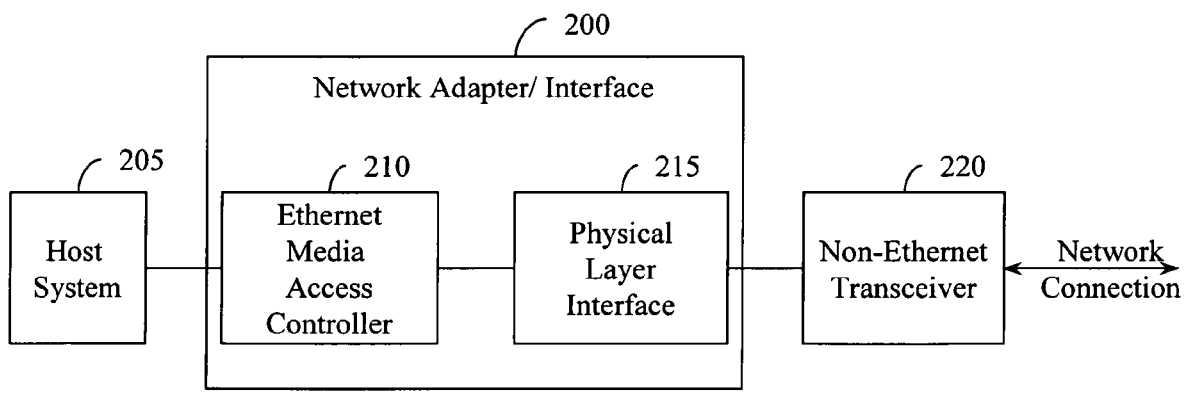
FIG. 2 illustrates one embodiment of a network adapter that can be used to connect an Ethernet device to a multidrop transceiver.

Illustrated in FIG. 2 is one example embodiment of a network adapter 200 that can be configured to operably connect a host device 205 to a multi-drop network. The network adapter 205 can be, for example, internally connected to the host device 205 as a network interface card (NIC) connected in a PCI card slot. The network adapter 200 can also be configured external to the host device 205.

In one embodiment, the network adapter 200 can be configured with an Ethernet media access controller (MAC) 210. The Ethernet MAC 210 includes logic configured to implement a data link layer (layer 2) based on the seven layers of the networking framework defined by the OSI model (Open System Interconnection). In accordance with the OSI model, the data link layer is divided into two sub-layers including the media access control (MAC) layer and the logical link control (LLC) layer. The MAC sub-layer controls how a computer on the network gains access to data and controls permission rights to transmit the data. The LLC layer controls frame synchronization, flow control, and error checking. The data link layer is defined by IEEE 802.3.

In order to provide a physical connection to a network, a physical layer interface 215 is provided. A physical layer interface is also referred to as a PHY and includes logic that implements the physical layer (layer 1) of the OSI model. In particular, the physical layer interface 215 is a non-Ethernet physical layer interface in that it is configured to implement the physical layer in accordance with a protocol different from Ethernet. This configuration facilitates providing communication between the Ethernet media access controller 210 and a non-Ethernet transceiver 220. In this manner, the type of the non-Ethernet transceiver 220 can be selected that allows the host device 205 to be connected as a node in a multi-drop network, rather than a common Ethernet network.

Since the Ethernet media access controller 210 is configured based on Ethernet protocol, it processes data that is Ethernet-based or generically speaking, Ethernet-compatible data. The non-Ethernet transceiver 220, however, is not configured to interpret or process Ethernet-compatible data, but rather, processes data according to its own protocol. As such, the non-Ethernet physical layer interface 215 is configured with logic that converts data between the Ethernet-compatible data and data compatible with the non-Ethernet transceiver 220. It will be appreciated that the term "data" is intended to include the definitions of "signals" as previously defined.

In one embodiment, the non-Ethernet transceiver 220 can be a serial transceiver that can be based on various protocols such as RS-232, RS-422, RS-485, or other desired transceiver capable of being connected to a multi-drop network. For purposes of discussion, the following example embodiments will be described based on a transceiver that is an RS-485 transceiver. It will be appreciated by one of ordinary skill in the art that the RS-485 transceiver can be substituted with other types of transceivers to implement similar configurations as described. Based on the type of transceiver used, appropriate modifications to the non-Ethernet physical layer interface 215 will be needed to properly convert data between the Ethernet protocol and the protocol of the selected transceiver.

Figure 3:
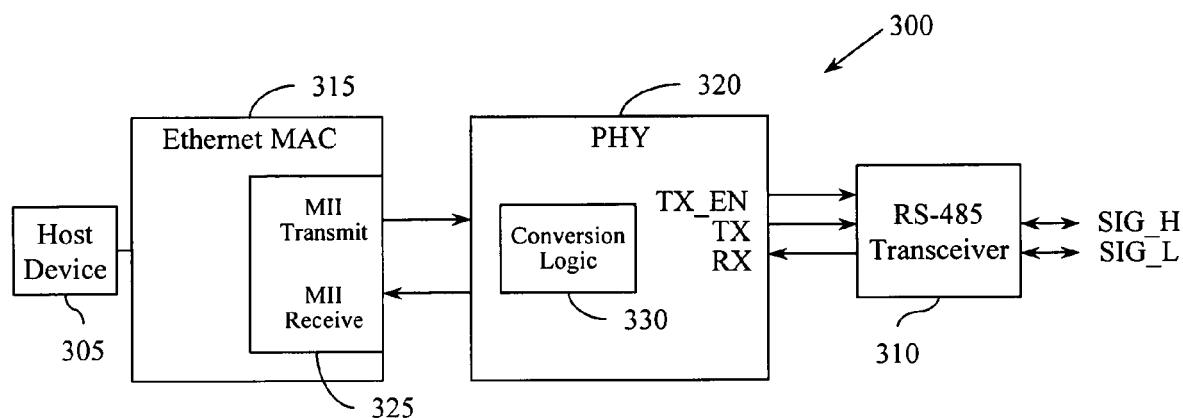
FIG. 3 illustrates one embodiment of a network adapter that functions between Ethernet and RS-485.

Illustrated in FIG. 3 is one embodiment of a system 300 configured to connect an Ethernet-based host device 305 to an RS-485 transceiver 310. By using the RS-485 transceiver 310, the host device 305 can be configured into a multi-drop Ethernet network since the RS-485 specification provides for multi-point communications. In one embodiment, the host device 305 can be a computing device configured to be connectable to a multi-drop network using an RS-485 transceiver 310 where the computing device is configured to convert Ethernet compatible signals at a media access control (MAC) layer to RS-485 compatible signals at a physical layer that can be processed by the RS-485 transceiver 310.

In general, the system 300 can be considered to include an Ethernet communication logic, an RS-485 communication logic, and a conversion logic that translates data between the Ethernet protocol and the RS-485 protocol. For example, system 300 can include a media access controller (MAC) 315 that is configured based on Ethernet specifications. For example, the Ethernet MAC 315 is defined by the IEEE 802.3 Ethernet standard and implements a data link layer (layer 2 of the OSI model). The Ethernet MAC 315 communicates data with a physical interface (PHY) 320 through a media independent interface (MII) 325.

The media independent interface is an Ethernet industry standard also defined in IEEE 802.3. The MII includes a data interface and a management interface between a MAC and a PHY. The data interface includes a channel for a transmitter and a separate channel for a receiver. Each channel has its own clock, data, and control signals. The MII data interface uses 16 signals and the management interface uses a 2-signal interface, where one signal is for clocking and the other signal is for data.

The PHY (PHYsical interface) 320 includes logic configured in accordance with the RS-485 specifications to communicate to the RS-485 transceiver 310. The PHY 320 can be configured with a conversion logic 330 for communicating data between the Ethernet MAC 315 and the RS-485 transceiver 310. As previously explained, the PHY 320 is not directly connected to the network bus as a typical Ethernet PHY would be, but rather, is connected to the RS-485 transceiver 310, which is the component that is directly connected to the network bus. Based on the RS-485 specification, the PHY 320 is configured with a transmit enable signal (TX_EN), a data transmission line (TX), and a data receive line (RX). The RS-485 transceiver 310 provides a 2-wire bus where one wire provides a signal high (SIG_H) and the other provides a signal low (SIG_L).

Since the RS-485 specification configures the data signal and the clock signal on the same differential wire pair, the conversion logic 330 will include an encoder to encode the separate clock signal and data signal from the MII 325 into a synchronous signal for transmission to the RS-485 transceiver 310. The conversion logic 330 will also include a decoder to decode the clock and data signals from the receive line (RX) into separate data and clock signals to function with the MII 325. A more detailed embodiment will be described with reference to FIG. 5.

It will be appreciated that the conversion logic 330 may be configured differently. For example, the conversion logic 330 may be part of the Ethernet MAC 315, or may be between the Ethernet MAC 315 and the PHY 320. Furthermore, one or more of the components from system 300 may be configured on the same printed circuit board, configured as a network interface card (NIC), and/or may be on separate printed circuit boards. One or more of the components of system 300 may be directly attached to the Ethernet-based host device 305, attached to a separate device such as a system board, or combinations of these.

Figure 4:
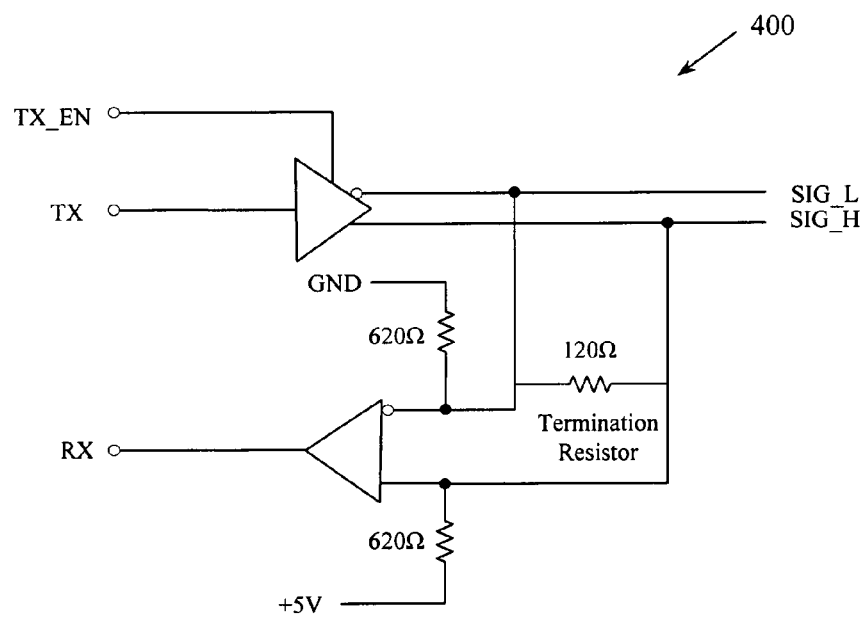
FIG. 4 illustrates one embodiment of an RS-485 transceiver.

With reference to FIG. 4, one embodiment of an RS-485 transceiver 400 is shown. The transceiver 400 can be used to implement the RS-485 transceiver 315 shown in FIG. 3 and/or other described transceivers. Similar signal lines are identified with the same references. The references include a transmit enable signal (TX_EN), a transmit signal (TX), receive signal (RX), a bus signal high (SIG_H), and a bus signal low (SIG_L). It will be appreciated by those of ordinary skill in the art that other configurations of an RS-485 transceiver can be implemented. For example, different types and connections for resistors can be used and the like.

Figure 5:
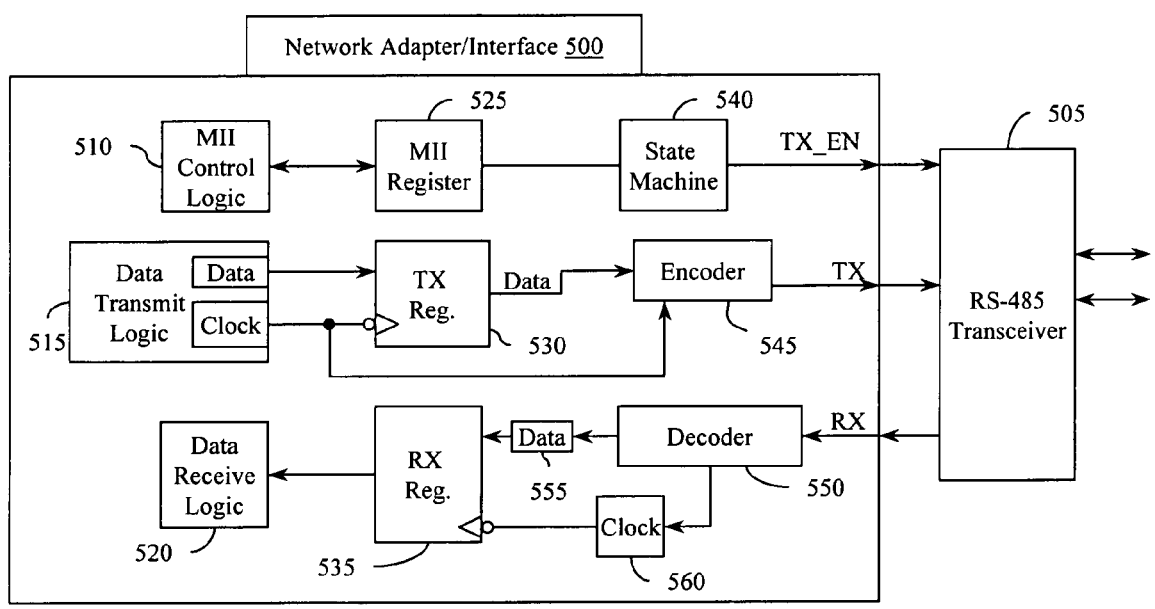
FIG. 5 illustrates another embodiment of a network adapter.

With reference to FIG. 5, one embodiment of a network adapter 500 is shown. The network adapter 500 is shown in terms of a simplified block diagram that illustrates example components and example logical and/or physical connections between the components. The components may be viewed in terms of their functions as being part of an Ethernet media access controller (MAC), a media independent interface (MII), and a physical interface that controls and connects with an RS-485 transceiver 505. The physical interface is also configured to convert signals between Ethernet-compatible signals and RS-485 compatible signals as previously described. Example components that may be part of the Ethernet MAC can include a media independent interface (MII) control logic 510, a data transmit logic 515, and a data receive logic 520. These components can be configured in accordance with Ethernet specifications for the data link layer (layer 2) of the OSI model.

Components that may be part of the media independent interface (MII) can include a variety of registers such as an MII register 525, a transmit (TX) register 530, and a receive (RX) register 535. Of course, one or more registers can be used to implement the illustrated registers. In one embodiment, the registers 525, 530, and 535 are implemented based on IEEE 802.3 specifications for the media independent interface as previously described.

Components that may be part of the physical interface and conversion logic can include a state machine 540, an encoder 545, and a decoder 550. Physical connections can be provided for signal lines such as a signal transmission enable TX_EN signal, a data transmission TX signal, and a data reception RX signal. The state machine 540 can be implemented in logic that controls the signal processes for data transmission, reception, and collision detection. The encoder 545 is configured to receive data signals and clocking signals from the data transmit logic 515 and encode the signals together for transmission to the RS-485 transceiver 505.

Conversely, the decoder 550 receives data from the RS-485 transceiver 505 and decodes the signals into data signals 555 and clocking signals 560. In one embodiment, the encoder 545 and the decoder 550 can be configured based on Manchester encoding/decoding. Manchester encoding is a synchronous clock encoding technique used by the OSI physical layer to encode the clock and data of a synchronous bit stream. Of course, other types of encoding/decoding algorithms and/or logic can be used.

Figure 6:
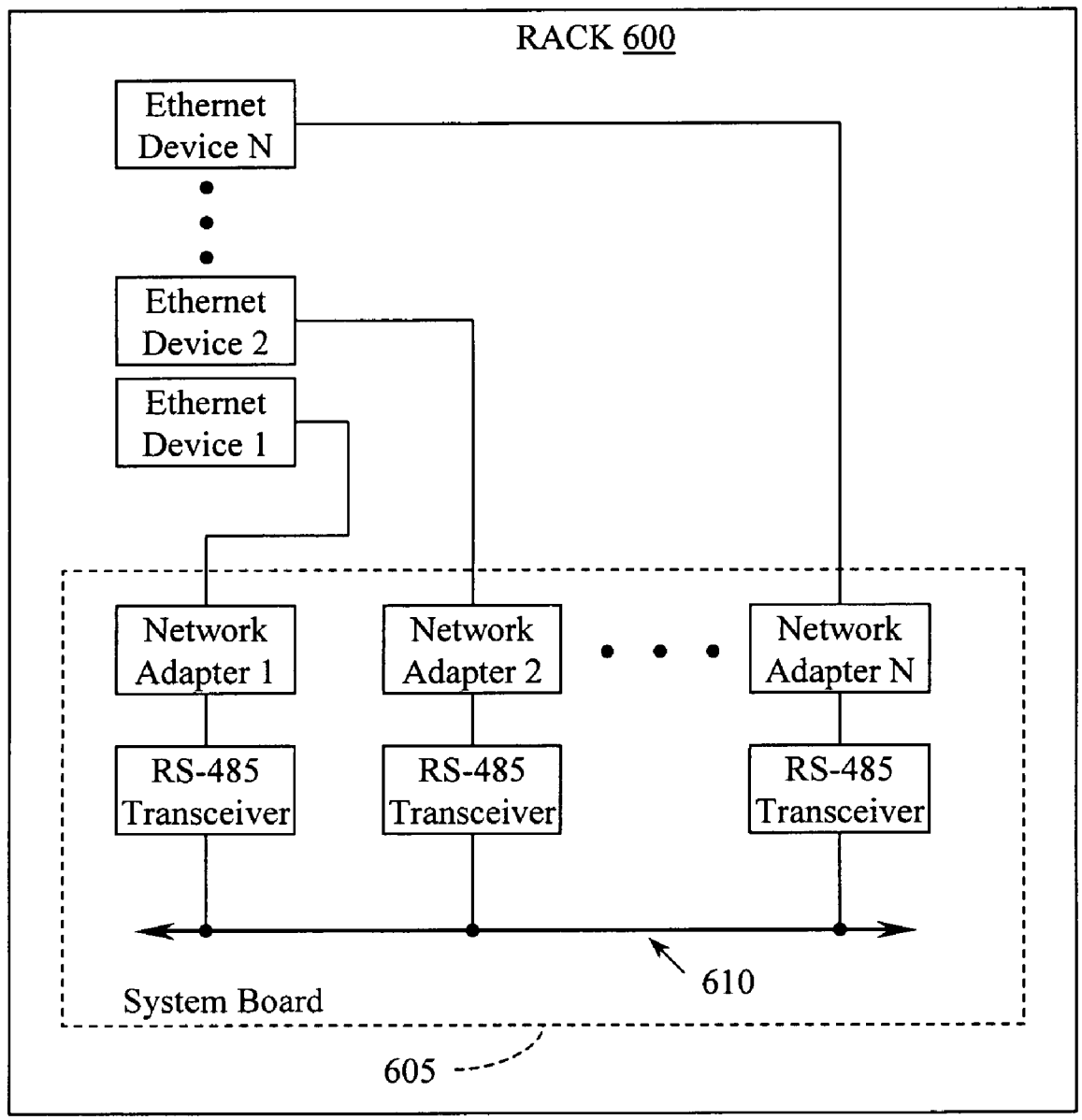
FIG. 6 illustrates one embodiment of a rack configured to connect Ethernet devices to a multi-drop network.

Illustrated in FIG. 6 is one example embodiment of a computer device rack 600 that is configured to house one or more Ethernet devices 1, 2, . . . N that can be inserted or removed into slots within the rack 600. In one example, the Ethernet devices can be servers. The rack 600 can include a system board 605 configured to connect the Ethernet devices 1-N into a multi-drop network on a multi-drop bus 610.

The system board 605 can include one or more network adapters 1-N that are configured similar to the previously described network adapters that convert Ethernet-compatible signals to RS-485 compatible signals. The network adapters 1-N are connected to the multi-drop bus 610 through one or more RS-485 transceivers as previously explained. It will be appreciated that the network adapters 1-N can include adapters that connect multiple Ethernet devices to the multi-drop bus 610. By configuring the network adapters and RS-485 transceivers onto a common system board 605, a simplified system is provided for attaching Ethernet devices into a multi-drop network rather than having each Ethernet device be configured with an internal network adapter.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

Figure 7:
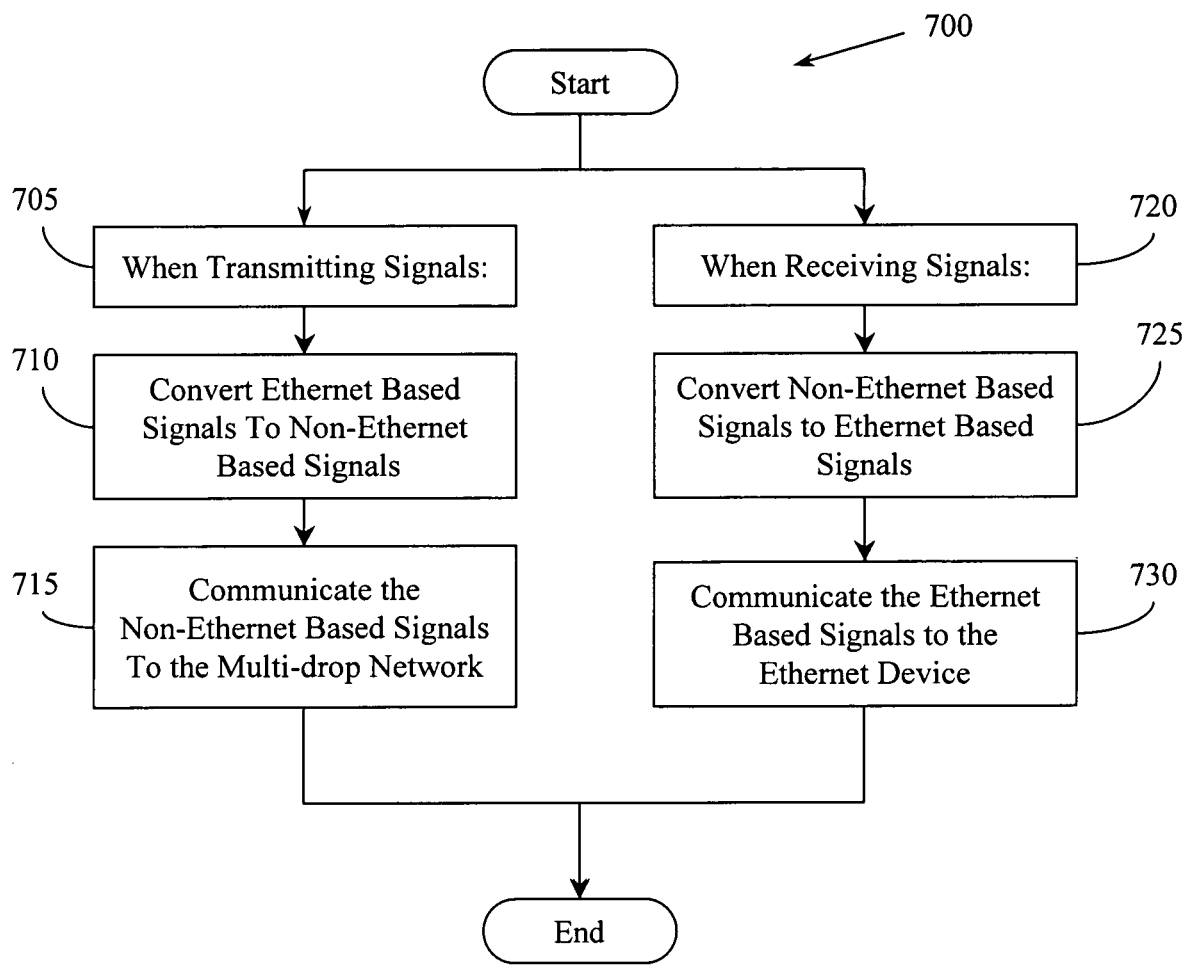
FIG. 7 illustrates one embodiment of a methodology for having an Ethernet device operate in a multi-drop network.

Illustrated in FIG. 7 is an example methodology 700 that can be associated with a voltage peak detector. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device. The illustrated diagrams are not intended to limit the implementation of the described examples. Rather, the diagrams illustrate functional information one skilled in the art could use to design/fabricate circuits, generate software, or use a combination of hardware and software to perform the illustrated processing.

Illustrated in FIG. 7 is one embodiment of a methodology 700 for allowing an Ethernet device to operate in a multi-drop network. The methodology 700 includes, for example, a process for transmitting signals to the network and a process for receiving signals from the network. The processes will be described with reference to an Ethernet device that communicates Ethernet based signals but where the multi-drop network communicates with non-Ethernet based signals.

When transmitting signals to the multi-drop network (block 705), Ethernet based signals are converted from the Ethernet device into non-Ethernet based signals (block 710). Then, the non-Ethernet based signals are communicated to a non-Ethernet transceiver where the non-Ethernet transceiver provides network connection to the multi-drop network (block 715).

When receiving signals from the multi-drop network (block 720), non-Ethernet based signals are converted to Ethernet based signals (block 725). Then, the Ethernet based signals are communicated to the Ethernet based device (block 730).

In one embodiment, the non-Ethernet transceiver is an RS-485 transceiver and the non-Ethernet based signals are RS-485 based signals. In another embodiment, the converting (blocks 710 and/or 725) can be performed in a physical layer interface that implements layer one of the Open System Interconnection model.

Figure 8:
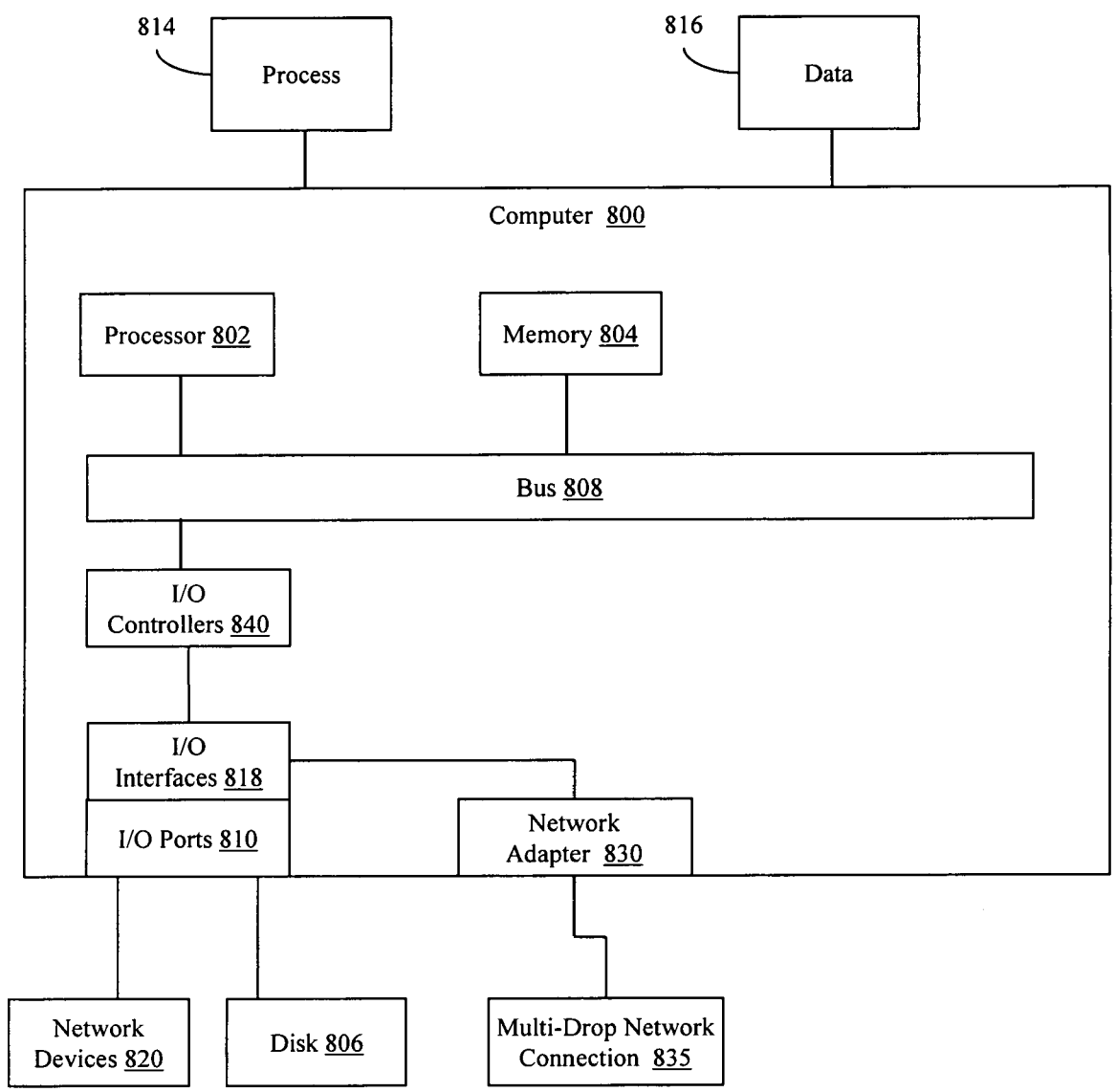
FIG. 8 illustrates an example computing environment in which example systems and methods illustrated herein can operate.

FIG. 8 illustrates an example computing device in which example systems and methods described herein, and equivalents, can operate. The example computing device may be a computer 800 that includes a processor 802, a memory 804, and input/output ports 810 operably connected by a bus 808. The computer 800 can be configured with Ethernet based firmware and other logic to communicate to an Ethernet network. In one example, the computer 800 may include a network adapter 830 that can be logic configured to facilitate connecting the Ethernet logic to a multi-drop network via a multi-drop network connection 835. The network adapter 830 can be implemented similar to the network adapters 200, 300, and/or 500 described in FIGS. 2, 3, and 5, respectively, and/or the other systems and methods described herein, and their equivalents. In one embodiment, the network adapter 830 is configured in accordance with the RS-485 specification to control an RS-485 transceiver as previously described for connection to a multi-drop network, and its equivalents.

Generally describing an example configuration of the computer 800, the processor 802 can be a variety of various processors including dual microprocessor and other multi-processor architectures. The memory 804 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 can include, but is not limited to, devices like a magnetic disk drive, a solid state disk drive, a floppy disk drive, a tape drive, a Zip drive, a flash memory card, and/or a memory stick. Furthermore, the disk 806 can include optical drives like a CD-ROM, a CD recordable drive (CD-R drive), a CD rewriteable drive (CD-RW drive), and/or a digital video ROM drive (DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and the like. The input/output ports 810 can include but are not limited to, serial ports, parallel ports, and USB ports.

The computer 800 can operate in a network environment and thus may be connected to network devices 820 via the i/o devices 818, and/or the i/o ports 810. Through the network devices 820, the computer 800 may interact with a network. Through the network, the computer 800 may be logically connected to remote computers. The networks with which the computer 800 may interact include, but are not limited to, a local area network (LAN), a wide area network (WAN), and other networks. The network devices 820 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 820 can connect to WAN technologies including, but not limited to, point to point links, circuit switching networks like integrated services digital networks (ISDN), packet switching networks, and digital subscriber lines (DSL).

In general, with the described systems, methods, and other embodiments, an Ethernet device can be connected as a node in a multi-point network. A cost effective solution includes configuring the devices to operate with an RS-485 transceiver, or other similar serial communication transceiver.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A network adapter configured to connect a host device to a network, the network adapter comprising:
    an Ethernet media access controller configured to implement a data link layer and process Ethernet compatible signals to and from the host device;
    a non-Ethernet physical layer interface configured to provide communication between the Ethernet media access controller and a non-Ethernet transceiver, the non-Ethernet transceiver being configured to allow the host device that is an Ethernet device to be connected as a node in a multi-drop network, where the multi-drop network is a non-Ethernet network; and
    the non-Ethernet physical layer interface being further configured to convert signals between the Ethernet compatible signals and signals compatible with the non-Ethernet transceiver.

2. The network adapter of claim 1 where the non-Ethernet transceiver is a serial transceiver.

3. The network adapter of claim 2 where the serial transceiver includes an RS-485 transceiver and the signals compatible with the non-Ethernet transceiver includes signals compatible with RS-485 protocol.

4. The network adapter of claim 1 where the non-Ethernet physical layer interface includes an electrical interface for converting signals between the Ethernet compatible signals and signals compatible with an RS-485 transceiver.

5. The network adapter of claim 1 further including a Media Independent Interface (MII) connected between the Ethernet media access controller and the non-Ethernet physical layer interface.

6. The network adapter of claim 1 where the non-Ethernet transceiver includes a differential electrical pair that allows multiple host devices to be on a network bus to form the multi-drop network.

7. The network adapter of claim 1 where the non-Ethernet transceiver includes one of: an RS-485 transceiver, an RS-422 transceiver, or an RS-232 transceiver.

8. A method comprising:
    forming a multi-drop network by connecting a plurality of Ethernet devices as nodes in the multi-drop network where the nodes are connected to a non-Ethernet multi-drop bus;
    when transmitting signals to the multi-drop network:
        converting Ethernet based signals from the Ethernet devices into non-Ethernet based signals; and
        communicating the non-Ethernet based signals to a non-Ethernet transceiver where the non-Ethernet transceiver provides network connection to the multi-drop network for a node; and
    when receiving signals from the multi-drop network:
        converting non-Ethernet based signals to Ethernet based signals; and
        communicating the Ethernet based signals to the Ethernet based device.

9. The method of claim 8 where the non-Ethernet transceiver is an RS-485 transceiver and the non-Ethernet based signals are RS-485 based signals.

10. The method of claim 8 where the converting is performed in a physical layer interface that implements layer one of the Open System Interconnection model.

11. A system, comprising:
    means for communicating Ethernet-based signals at a data link layer of network communications, the means for communicating including an Ethernet media access controller;
    means for converting the Ethernet-based signals to and from serial transceiver signals for controlling a serial transceiver device, the serial transceiver device being operable to connect the Ethernet media access controller to a non-Ethernet multi-drop network as part of a node on the non-Ethernet multi-drop network; and
    a physical layer interface configured to provide communication between the Ethernet media access controller and the serial transceiver device.

12. The system of claim 11 where the serial transceiver device includes one of: an RS-485 transceiver, an RS-422 transceiver, or an RS-232 transceiver.

* * * * *